United States Patent
Gill et al.

(10) Patent No.: US 8,340,498 B1
(45) Date of Patent: Dec. 25, 2012

(54) EXTRACTION OF TEXT ELEMENTS FROM VIDEO CONTENT

(75) Inventors: Sunbir Gill, Seattle, WA (US); Kamlesh T. Talrja, Seattle, WA (US); Peter A. Schwabland, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 952 days.

(21) Appl. No.: 12/364,944

(22) Filed: Feb. 3, 2009

(51) Int. Cl.
*H04N 9/80* (2006.01)

(52) U.S. Cl. .......................... 386/241; 386/245

(58) Field of Classification Search .................. None
See application file for complete search history.

(56) References Cited

U.S. PATENT DOCUMENTS

| | | | |
|---|---|---|---|
| 6,185,329 B1 | 2/2001 | Zhang et al. | |
| 6,430,357 B1 * | 8/2002 | Orr | 386/244 |
| 7,068,286 B2 * | 6/2006 | Powell et al. | 345/611 |
| 2002/0007371 A1 * | 1/2002 | Bray | 707/501.1 |
| 2003/0118183 A1 * | 6/2003 | Struyk | 380/213 |

* cited by examiner

*Primary Examiner* — Huy T Nguyen
(74) *Attorney, Agent, or Firm* — Lee & Hayes, PLLC

(57) ABSTRACT

Video content comprising a plurality of frames containing textual and non-textual elements is processed. A portion of the plurality of frames is selected for analysis to identify textual elements in the frames corresponding to pre-defined textual elements. The identified textual elements are stored along with their location within the video content. In some embodiments, each of a subset of frames included in the portion is analyzed until the pre-defined textual element is identified in a start frame. A plurality of successive frames subsequent to the start frame is analyzed to identify pre-defined textual elements in the frame. Analyzing the frames includes filtering the frames to remove non-textual elements and increase the visibility of the textual elements contained therein. A confidence rating is calculated for the identified textual elements according to some embodiments.

23 Claims, 7 Drawing Sheets

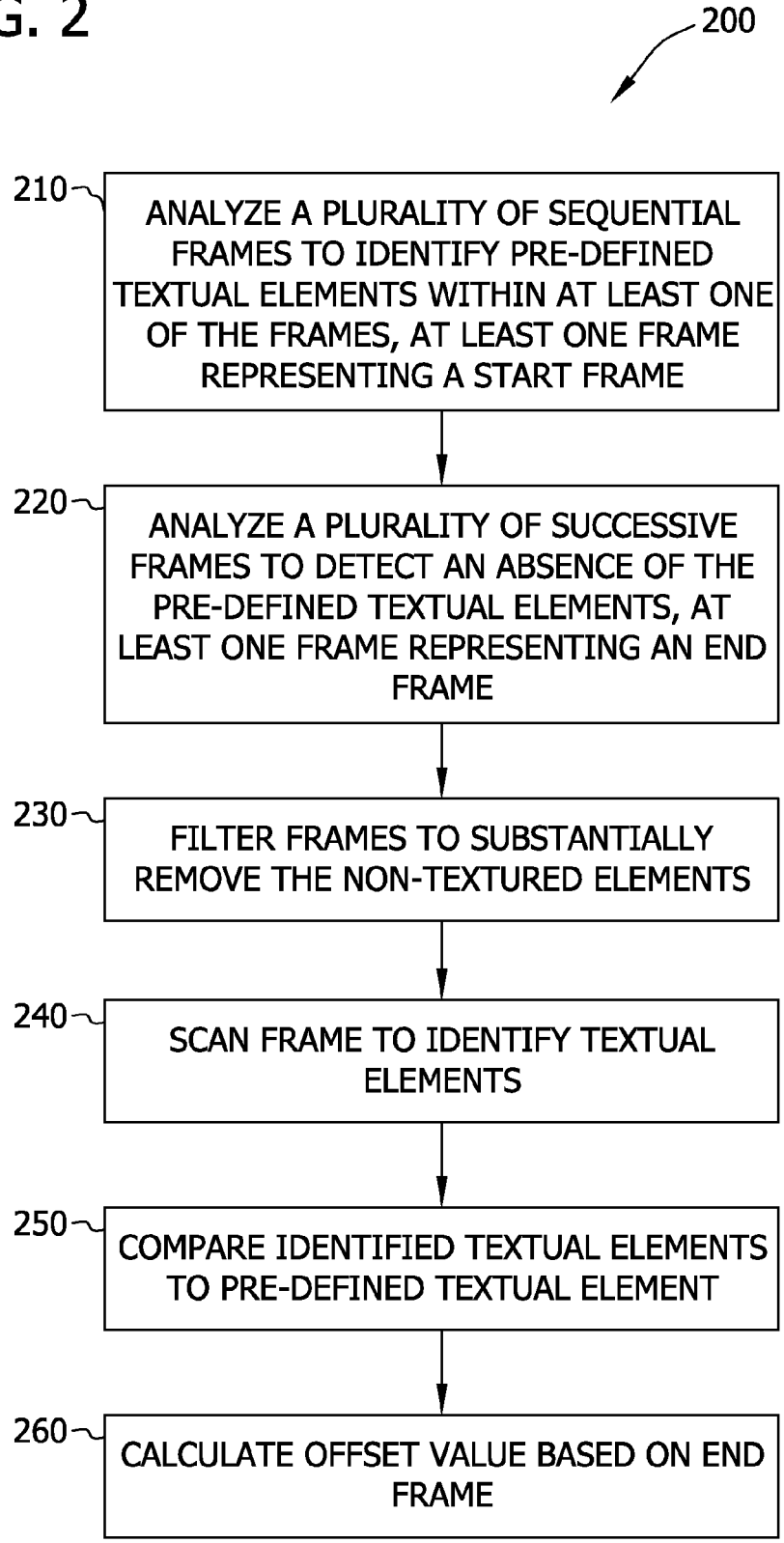

EXTRACTION OF TEXT ELEMENTS FROM VIDEO CONTENT

BACKGROUND

Video content (e.g., videos or motion pictures) often contains text that is readable by a user viewing the video content. For example, the text can include information such as a title, film rating, actor names, copyright infringement warning, film production credits, the names of products or businesses, and other textual information.

Existing systems attempt to provide accurate video content information in individual directories or databases. For example, some websites provide lists of actors and production credits for thousands of movies. However, the websites often rely on users of the websites and manual entry for the information, and therefore it is oftentimes inaccurate. Automated systems attempting to analyze the entire video to identify text yields unsatisfactory results. For example, analyzing each frame of a video is time-consuming and cost prohibitive, as a typical video with ninety minutes of content stored therein at thirty frames per second has 162,000 frames. Analyzing each frame therefore requires significant expense and time. Further, current optical character recognition (OCR) systems are not able to consistently recognize text that is interspersed over noisy backgrounds, such as graphics or images typically found in videos. For example, the contrast between the text and the rest of the image is often insufficient for the OCR system to distinguish between the text and the rest of the image.

In some systems, distributors or retailers of video content permit the user to view a short preview (e.g., the first two minutes) of the video prior to purchase. Text displayed at the beginning of the video (e.g., the copyright warning or opening credits) usually consumes an inordinate portion of the preview due to the preview's limited duration. Attempts to offset the beginning point of the preview by a set number of frames or period of time have proved unsuccessful as there is not an industry-wide standard number of frames or amount of time that the opening text is displayed.

BRIEF DESCRIPTION OF THE DRAWINGS

FIG. 2 is an example flow chart for processing video content.

Corresponding reference characters indicate corresponding parts throughout the drawings.

DETAILED DESCRIPTION

Figure 1:
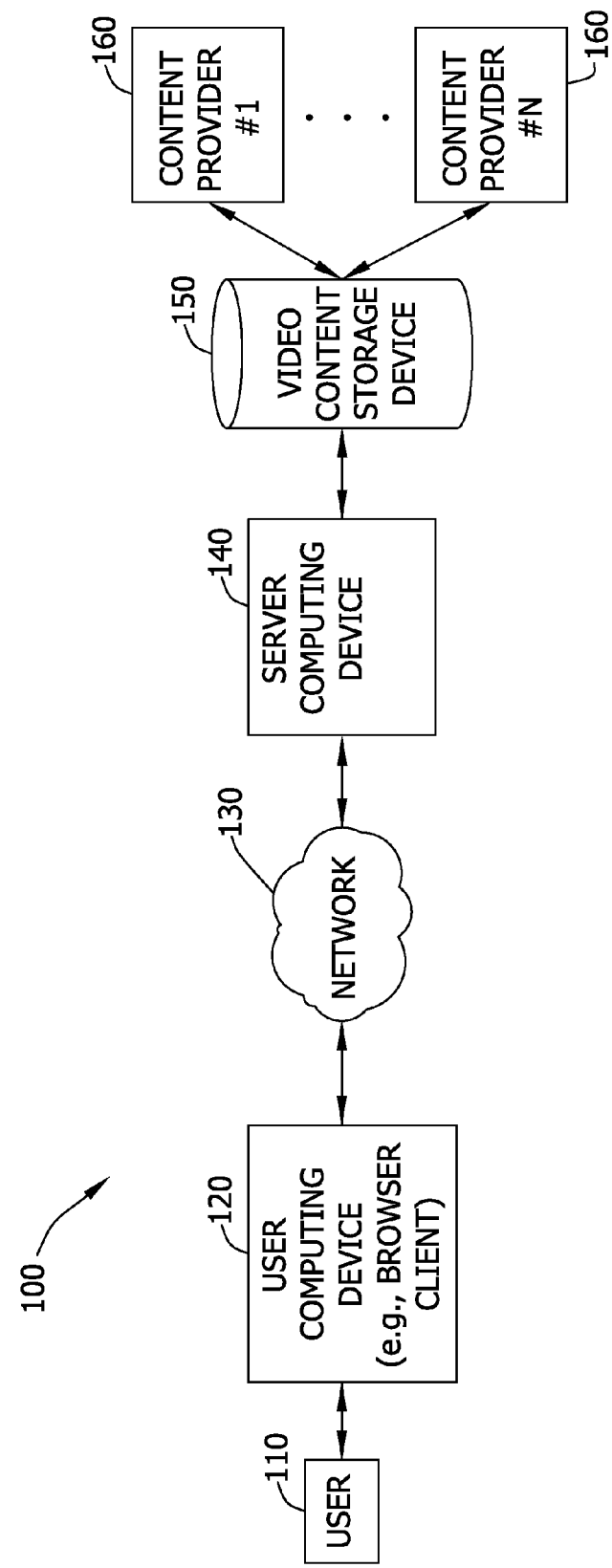
FIG. 1 is a block diagram illustrating an example system according to an embodiment in which a client computing device communicates with a server computing device and a video content storage device via a network.

Disclosed embodiments enable the processing of video content having a plurality of frames that include textual and non-textual elements with a system such as illustrated in the system 100 of FIG. 1. In such embodiments, the processing of the video content generally comprises identifying textual elements within the plurality of frames and then storing the identified textual elements along with their relative position within the video. The examples and description provided herein use video content, motion pictures, videos, or the like (hereinafter collectively referred to as "video content") as examples. However, the embodiments are not limited to those involving the specific video content described herein, as other types of video content are contemplated as well.

Textual elements within the video content often comprise characters forming words or numbers. The words or numbers, in turn, describe information relating to a variety of aspects relating to the video content, such as film ratings, copyright warnings, production credits, and the like. Processing the video content and identifying textual elements permits their location and content to be stored. The content of the textual elements is used for a variety of purposes, such as populating a database with the information contained in the production credits or locating textual elements that relate to places, products, or businesses (e.g., locating textual elements that include the name of a specific product). Locating particular textual elements within the video content also aids in identifying specific segments of the video content. For example, identifying and locating textual elements relating to a Federal Bureau of Investigation (FBI) warning enables identification of portions of the video content that are unlikely to contain content of interest to a user. Such portions can then be skipped when previewing the video content. Identifying textual elements within the video content also aids in capturing information populate in a database, such as data included in the production credits.

While examples are described herein with reference to textual elements commonly displayed near the beginning or end of video content (e.g., FBI warnings and production credits), other types of textual elements are contemplated as well. For instance, the disclosed embodiments can be implemented to identify other types of textual elements such as the names of products, services, or businesses or any other textual element. Embodiments are also not limited to apply only to users, human or otherwise. The user includes a human user and a computer program or application (e.g., a "bot"). Further, while the embodiment of FIG. 1 may be interpreted to illustrate a client-server relationship between the computing devices, other configurations are contemplated, such as a peer-to-peer to relationship between the computing devices. Additionally, aspects of the present disclosure are operable on encoded video content (e.g., according to the Motion Pictures Experts Group) or unencoded video content (e.g., raw video content).

In some embodiments, the textual elements identified in the plurality of frames are the names of products, brands or businesses. Accordingly, by determining the location of textual elements corresponding to the products, brands, or businesses within the video content, advertising related to the product, brand, or business can be inserted at portions of the video content that coincide with frames. Aspects of the present disclosure contemplate the marketing of advertisements within the video content based on the frequency of the product or service within the video content, or based on the location or position of the product or service in the video content.

Disclosed embodiments utilize a server computing device 140 to process the video content. A user 110 accesses a user computing device 120 such as a browser client to view video content presented thereon. Video content is communicated to the user computing device 120 through a network 130. The network 130 is any type of network that communicatively couples computing devices. Examples of the network 130 include the Internet, a peer to peer (P2P) network, a local area network (LAN), or a wide area network (WAN).

The user computing device 120 is any device capable of accessing the network 130 and presenting video content to the user 110. By way of example only, and not limitation, these devices include a laptop, a desktop computer, a set-top box, a handheld device such as an electronic book reader, a cellular phone or smart phone, or a video gaming device. The user computing device 120 includes a form of computer-readable media that stores, among other things, application or programs. The user computing device 120 includes a user input device that enables the user 110 to enter information into the user computing device 120. These include, for example, a keyboard, a pointing device, or an audio input device. The user computing device 120 also includes one or more output devices, such as a graphical display device or an audio output device.

Stored on the computer-readable media associated with the user computing device 120 is a user interface such as, among other possibilities, a web browser. Web browsers enable users, such as user 110, to display and interact with media (e.g., video content) and other information typically embedded on a web page or a website on the server computing device 140. Furthermore, a media player or other similar program can be stored on the computer-readable media on the user computing device 120. Media players enable users, such as user 110, to display media (e.g., video content).

Server computing device 140 is communicatively coupled through the network 130 to the user computing device 120. Server computing device 140 is any type of server that contains a processor operable to execute computer executable instructions and a memory to store and retrieve information. In some embodiments, the server computing device 140 hosts an e-commerce website. The server computing device 140 is communicatively coupled to a video content storage device 150, upon which video content is stored. Video content can take the form of individual files corresponding to a particular video, or number of individual files may form a single video. The video content storage device 150 can be a form of computer-readable media, such as a hard disk drive or optical disk drive. In some embodiments, the video content storage device 150 is integrated with the server computing device 140.

One or more content providers 160 such as content provider #1 through content provider #N provide video content to the video content storage device 150. The video content can be provided over a network in some embodiments (not shown) or provided by any other suitable method, such as the physical transfer of computer-readable media to the video content storage device 150 or the server computing device 140.

According to some embodiments, processing video content includes selecting a portion of the video content and at least a subset of frames contained in the portion to analyze. A portion of the video content is a group of frames in the video content and a subset is a sequential set of frames contained within the portion. The sequential set of frames includes, for example, one frame for every second of the portion of the video content or every frame within the portion of the video content. By selecting only a portion of the video content, the time and associated computing resources for analyzing the video content are significantly reduced. However, embodiments of the present disclosure are also applicable to embodiments wherein the substantially all of the video content is analyzed, and not just a portion thereof.

The selection of which portion of the video content to analyze can be made based on the type of textual elements that are to be identified therein. Identification of different textual elements results from the analysis of different portions of the video content. For example, in embodiments that seek to identify textual elements comprising an FBI warning or opening production credits; a portion at or near the beginning of the video content (e.g., the first two to five minutes) is analyzed. In other embodiments that are configured to identify textual elements comprising production credits; a portion at or near the end of the video content (e.g., the last twelve to fifteen minutes) are subjected to analysis. Additionally, in embodiments that seek to identify textual elements that are likely to be interspersed throughout the video content (e.g., references to products, services, businesses, etc.), the beginning and end portions of the video content can be excluded. For example, the portion could begin seven minutes from the beginning of the video content and end ten minutes before the end of the video content.

The subset of sequential frames within the selected portion is then analyzed. The subset can include frames equally or unequally spaced apart at a set interval within the selected portion. The interval can be temporally defined (e.g., one frame per second) or spatially defined (e.g., every thirtieth frame). As described in greater detail in relation to FIG. 2 and FIG. 4, below, each of the frames is filtered to substantially remove the non-textual elements from the frame. The filtered frame is scanned by an OCR system to identify textual elements.

Turning next to FIG. 2, a flow chart illustrating a method for processing video content having a plurality of frames comprising textual and non-textual elements is presented. In FIG. 2, the video content is being searched for one or more pre-defined textual elements. For example, the video content is searched for the FBI warning, which includes pre-defined textual elements such as title, copyright, copyright warning, chapter, caption, credit, prologue, epilogue, a product name, a brand name, and more.

The embodiment depicted in FIG. 2 is implemented to identify a start frame within the plurality of frames, wherein the start frame is the first frame containing a pre-defined textual element. Successive frames adjacent to the start frame are then analyzed, and an end frame is identified as the first frame where the absence of the pre-defined textual element is identified. An offset value indicating the position of the end frame within the video content is then calculated and stored with the video content.

In an exemplary embodiment, the method depicted in FIG. 2 is used to identify the frames within video content that contain an FBI warning or other opening production credit. By analyzing the frames and determining an end frame where the FBI warning is absent, an offset value can be calculated. During playback of the video content to the user, the offset value is used to determine which frame within the video content the playback should commence with to avoid presenting the FBI warning. As described above, avoiding the presentation of the FBI warning, or other opening credits, is advantageous when a small portion (e.g., the first two minutes) of the video content is presented to the user and playback of the FBI warning would otherwise consume an inordinate amount of time during the presentation.

The method illustrated in FIG. 2 begins at block 210 with analyzing a plurality of sequential frames of the video content to identify one or more pre-defined textual elements within at least one of the frames. At least one of the frames represents the start frame. The pre-defined textual elements can be characters, words, or phrases, or any combination thereof. For example, in the exemplary FBI embodiment, the pre-defined textual elements can be a series of words or phrases that are typically found within an FBI warning such as copyright, FBI, criminal, infringement, warning, or fine. In other embodiments, the pre-defined textual elements can be a series of words or phrases that are typically found within the opening credit sequence in a video such as chapter, caption, credit, prologue, produced, directed, names of film production studios, or any variant thereof.

The plurality of sequential frames is selected from a portion of the video content. For example, the plurality of sequential frames are selected from the first five minutes of the video content, and include frames spaced apart within the subset, either as a time duration (e.g., one frame per second) or quantity of frames (e.g., every thirtieth frame). By focusing the analysis on only a portion of the video content, the computing resources for executing the method are significantly reduced. While the plurality of sequential frames is sequential and spaced apart from each other, they are still temporally proximal to each other.

The analysis of each of the plurality of sequential frames proceeds according to the steps described in block 230, 240, and 250 below until a start frame is determined. The start frame is the first frame within the plurality of sequential frames in which the pre-defined textual element is identified. Upon determining that one of the sequential frames is a start frame, the method continues to block 220.

In block 220, a plurality of successive frames subsequent to the start frame is analyzed to detect the absence of the pre-defined textual elements within at least one of the frames. The plurality of successive frames is individual frames that are analyzed in the order they would be presented to a user, without being spaced apart as with the plurality of sequential frames. Further, the analyzed frames are temporally proximal to each other. In some embodiments, the analyzed frames are adjacent to each other. In the example of FIG. 2, every frame after the start frame is analyzed until the absence of the pre-defined textual element is detected. Examining every frame or nearly every frame ensures that the first frame lacking the pre-defined textual element is identified.

The analysis of each of the plurality of successive frames proceeds according to the steps described in blocks, 230, 240, and 250 until an end frame is detected. The end frame is the first frame of the analyzed frames in which an absence of the pre-defined textual elements is identified. In the FBI warning example, the end frame would be the first frame that did not contain any of pre-defined textual elements that were indicative of the FBI warning. Upon determining that one of the successive frames is the end frame, the method proceeds to block 260.

The processes described in blocks 230, 240 and 250 comprise the analysis performed upon frames in each of blocks 210 and 220.

Each of the frames is filtered in block 230 to substantially remove the non-textual elements from the frame. In some embodiments, each frame is rasterized prior to being filtered. The filtering can comprise the processes of decolorizing the frame, removing noise from the frame, or inverting colors in the frame. The filtering of the frame converts the frame into a format that is compatible with typical OCR systems.

An example of pseudo-code utilized to filter the frame is depicted below.

```
pixelOut_grayscale =
    filter (pixelIn_red, pixelIn_green, pixelIn_blue,
tolerance_noise) {
        pixel_out = averageIntensity (pixelIn_red,
pixelIn_green, pixelIn_blue)
        if (pixel_out < tolerance_noise) {
            pixel_out = 0
        }
        else if (pixelout > max_intensity -
tolerance_noise) {
            pixel_out = max_intensity
        }
        return pixel_out
    }
```

The filtered frame is scanned in block 240 to identify one or more textual elements. The textual elements can comprise characters, individual words, phrases, or any combination thereof. Typical OCR systems are used to scan the filtered frames, such as open source systems (e.g., TESSERACT), or commercial systems such as ASPRISE.

In block 250, the identified textual elements are compared to the pre-defined textual elements. The comparison is performed by one or more algorithms and determines whether any of the identified textual elements correspond to any of the pre-defined textual elements.

A score is generated in some embodiments to indicate the likelihood that the frame in which the textual elements are identified corresponds to a desired frame (e.g., a frame containing an FBI warning). The score takes into account a variety of factors. According to one embodiment, the score is based on three factors: 1) a delta value representing a normalized offset of the frame into the subset of frames (i.e., if the subset is 60 frames in length and the frame is the $15^{th}$ frame, the normalized offset is 15/60=0.25); 2) a count value representing a quantity of identified textual elements; and 3) the number of identified textual elements that correspond to the pre-defined textual elements.

A score is computed by, for example, calculating the sum or weighted sum of the values represented by the three factors. The score is compared to a pre-defined range of scores resulting in a determination of whether the frame corresponds to the desired frame (e.g., the frame showing the FBI warning). For example, if the score is between one and five, a determination is made that the frame corresponds to the desired frame, while if the score is less than or equal to one or greater than or equal to five the frame does not correspond to the desired frame. The values and scores presented herein are for illustrative purposes only and should not be construed to be limiting.

If the frame being analyzed is determined to correspond to the desired frame, an offset value is calculated in block 260. The offset value includes a position within the video content relative to the beginning of the video content. The position can be defined as a duration of time (e.g., 94 seconds) or as quantity of frames (e.g., 75 frames). For example, when the frame is the seventy fifth frame of the video content, the offset value is seventy five frames. The offset value is stored with the video content in the form of metadata according to some embodiments.

Figure 3A:
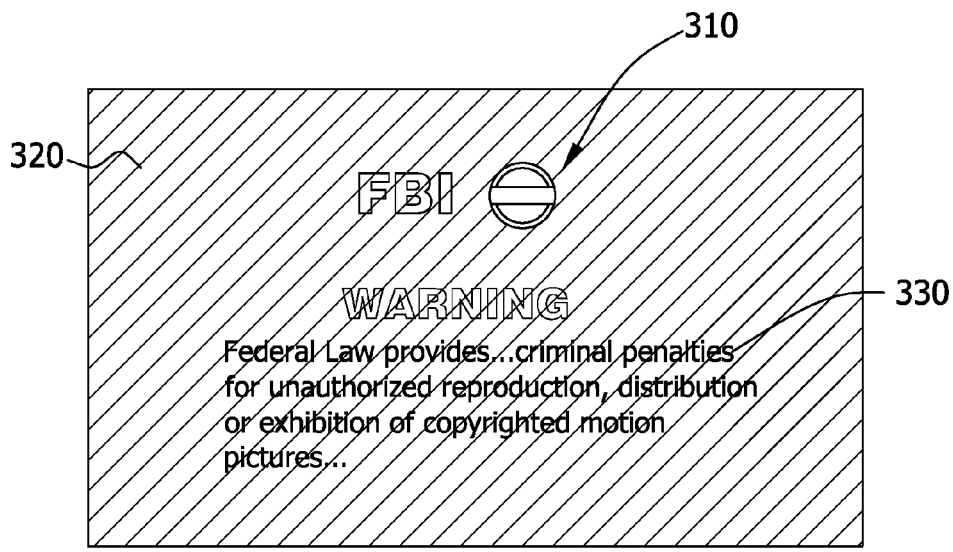
FIG. 3A is an example screen shot of a frame of video content prior to processing.
Figure 3B:
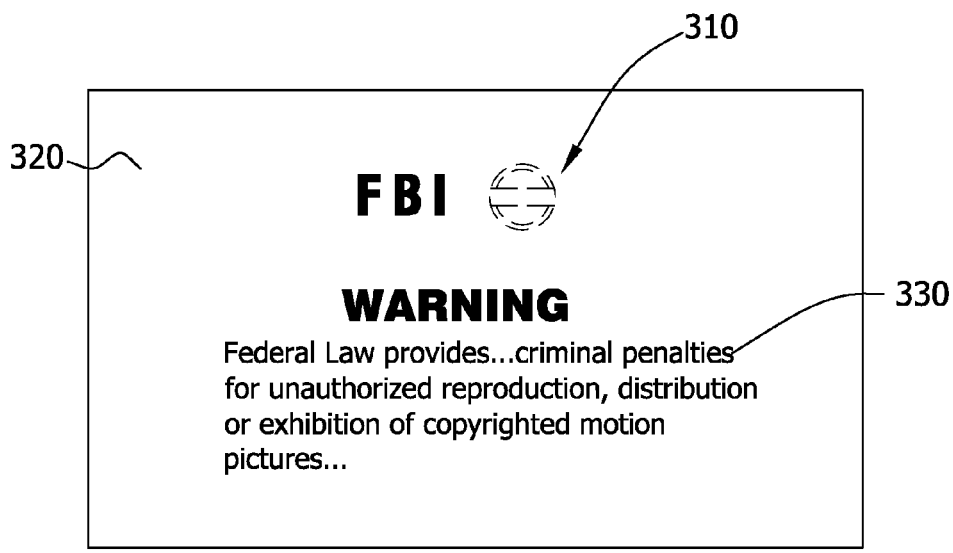
FIG. 3B is an example screen shot of the frame of video content depicted in FIG. 3A after processing.

Turning now to FIG. 3A, an example screen capture of a frame of video content prior to processing is presented. The screen capture depicts the frame as it is presented to the user viewing the video content in its pre-processed state. The screen capture includes an exemplary non-textual element 310 and exemplary textual elements 330, among other elements. Both the exemplary non-textual element 310 and textual elements 330 are overlaid on a background 320. The embodiment depicted in FIGS. 3A and 3B is that of a frame of video content contains an 'FBI warning'. The exemplary non-textual element 310 is indicia representing the FBI seal while the exemplary textual elements 330 are words comprising a statement regarding criminal copyright infringement and associated possible punishment for violations thereof, commonly referred to as the FBI warning, as described above.

The content of the textual element 330 includes one or more of the following words (i.e., textual elements) according to the 'FBI warning' embodiment described above in relation to FIG. 2:

Warning: The unauthorized reproduction or distribution of this copyrighted work is illegal. Criminal copyright infringement, including infringement without monetary gain, is investigated by the FBI and is punishable by up to 5 years in federal prison and a fine of $250,000.

In some embodiments, the textual elements 330 include the following set of words: {"fbi", "warning", "commercial", "duplication", "copyright", "material", "licensing", "forbidden", "federal", "law", "violaters ",", subject", "civil", "criminal", "penalties", "exhibition", "copyrighted", "infringement", "maximum", "unauthorized", "distribution", "reproduction", "exhibition", "investigates", "allegations", "motion", "pictures", "prison", "fine"}.

The overlay of the exemplary textual elements 330 over the background 320 renders the frame ill-suited for processing by an OCR system. Accordingly, processing of a frame like one depicted in FIG. 3A by an OCR system yields unsatisfactory results, with either the OCR system failing to identify any textual elements in the frame or incorrectly identifying textual elements.

FIG. 3B depicts an example screen shot of the frame of video content depicted in FIG. 3A as it appears after it has been processed in accordance with the exemplary instructions illustrated and described with reference to FIG. 2. In FIG. 3B, the visibility of the exemplary non-textual element 310 has been significantly reduced by the processing of the frame. The contrast between the exemplary textual elements 330 and the background 320 of the frame has been increased as well, with the content of the background 320 having been removed. Accordingly, after processing, substantially all of the non-textual element 310 is removed, while the background 320 is substantially eliminated as well. An OCR system is then able to readily process a frame as depicted in FIG. 3B as it closely represents the type of plain text that OCR system is able to process.

Figure 4:
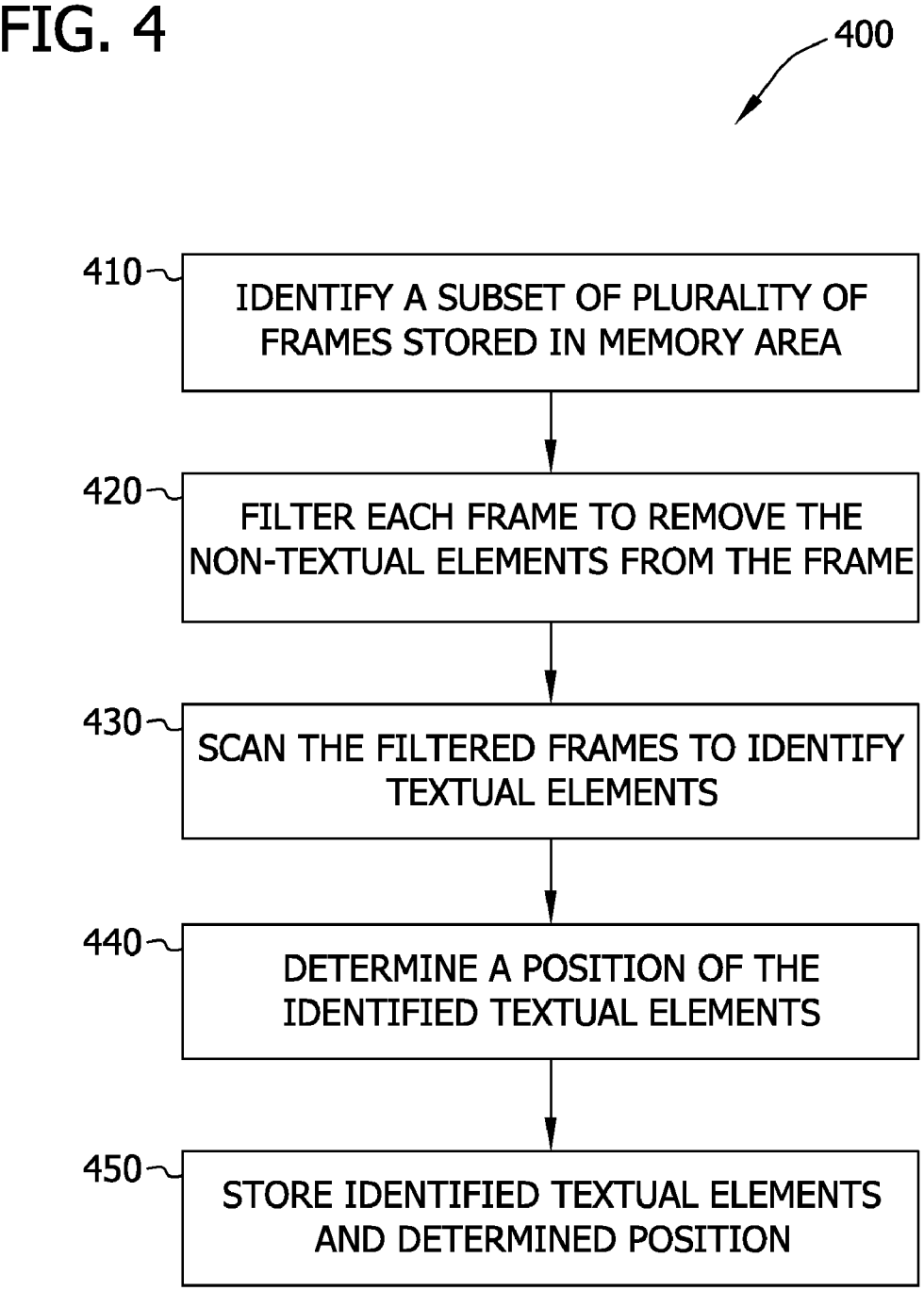
FIG. 4 is an example flow chart for filtering frames of video content to remove non-textual elements.

With reference now to FIG. 4, an example flow chart depicts a method for identifying any textual elements within the video content. The method is performed within a system comprising a memory area for storing video content and a processor processing the video content. As in the method described above in relation to FIG. 2, the video content has a plurality of frames comprising textual and non-textual elements.

The method begins in block 410 with identifying a subset of the plurality of frames stored in the memory area. Different subsets are identified based on the type or category of textual elements that are being sought. For example, if production credits are sought, the subset of frames includes those frames near the beginning of the video content to capture the types of production credits typically included as textual elements near the beginning of the video content (e.g., title, director, producer, etc.). Additionally, the subset of frames includes frames positioned near the end of the video content to capture the types of production credits displayed at or near the end of the video content (e.g., all the actors, grip, sound production, musical director, etc.). Both subsets of frames—those at the beginning and end of the video content—can be included within a single subset, or they can be included within their own respective, separate subsets.

In some embodiments, the textual elements to search for are spread throughout the video content. These can be references to the names of products, businesses, peoples, places, events, etc. Accordingly, the subset of frames for this category of video content begins a few minutes into the video content (e.g., about five minutes, to exclude the introduction production credits) and ends a few minutes (e.g., about ten minutes, to exclude the other production credits) before the end point of the video content. Frames of the video content, which likely contain the type or category of textual elements being sought after, are thus included in the subset of frames. Those frames which are unlikely to contain the textual elements are excluded from the subset of frames.

In block 420, each of the identified plurality of frames is filtered to substantially remove the non-textual elements from the frame. The filtering of the frames is similar in operation to that described in relation to block 230 in FIG. 2. Other means are provided in some embodiments for removing non-textual elements from the frame. For example, the frames can be decolorized and converted to gray-scale images.

The filtered frames are scanned by an OCR system in block 430 to identify or recognize one or more of the textual elements. In some embodiments, two or more successive frames are scanned to determine the textual elements common to the two or more successive frames. For example, similar textual elements across the successive frames are identified (e.g., see Table 1 below). One of the similar textual elements is then selected (e.g., based on a confidence rating or other measure).

The category of identified textual elements can provide implicit constraints on or corrections to the identified textual elements. For example, when the textual elements are names, the first letter of the name is capitalized under normal grammatical rules. Accordingly, if the OCR system identified the textual element "lurry murphY", the textual element would be corrected to "Lurry Murphy."

Additionally, in some embodiments, a confidence rating or measure is also calculated for each recognized textual element based on one or more factors. A higher confidence rating indicates a greater likelihood that the identified textual element corresponds to the valid textual element. According to some embodiments, three factors are utilized in determining the confidence rating: 1) verification of the identified textual elements against a list of pre-defined textual elements; 2) measure of confidence provided by the OCR system; and 3) comparison of the same identified textual elements within a bounding box from successive frames.

For the first factor, the textual elements identified by the OCR system are compared against a list, ordered or unordered, or database of the pre-defined textual elements. In the production credits example, the database contains the names of actors and other individuals involved in video production. The database is, for example, a movie website providing a reasonably trusted list of production credits for various movies. In the example above, by comparing "Lurry Murphy" to such a database, an appropriate numerical indicator value is generated. If there are no entries in the database corresponding to "Lurry Murphy", a numerical indicator value indicating such is generated. For example, the numerical indicator value can simply be an indication of the confidence of whether the textual element corresponds to an entry in the database, with a value of '0' indicating the lack of confidence and a value of '10' indicating a high confidence level. Any suitable indicator convention can implemented according to embodiments of the invention. In some embodiments, the confidence is represented as a percentage from 0-100%.

The second factor is measure of confidence provided by the OCR system that indicates the OCR system's confidence in its scanning and output of the identified textual elements. Various OCR systems output measures of confidence according to different scales, and according to some embodiments these scales are normalized to reflect a range of numerical indicator values from '0' to '10', with '0' representing no confidence in the output and '10' representing a high level of confidence. Numerical indicator values in between the '0' and '10' indicate varying levels of confidence.

The third factor involves the analysis of sequential or successive frames of video content. In successive frames of video content, the identified textual elements are often present in more than one frame. The output of the OCR system is compared across multiple such frames. For example, in a typical production credit sequence, textual elements are presented in multiple frames spanning multiple seconds of video content (e.g. about thirty to sixty frames). Analyzing successive frames of the video content yields multiple samples for a textual element based on bounding box intersection between the textual elements in the successive frames. A text similarity algorithm, such as a Levenshtein text similarity algorithm) is employed to identify correlations between the textual elements in the successive frames. When the same identified textual elements are present across multiple frames, a numerical indicator value is greater (e.g., among values ranging from '0' to '10'). If the identified textual elements are not present across multiple frames, or there is less similarity among the text, the numerical indicator value is lower. The numerical indicator represents a frequency of occurrence of the identified textual element across different frames.

The three measures described above are combined to select a textual element amongst a set of possible textual elements. For example, the individual numerical indicator values are summed in a weighted fashion as shown in Equation (1) below.

$$\text{rank}_i = w_{ocr}\text{NormalizedOCRConfidence}_i + w_{name}\text{NormalizedNameConfidence}_i + w_{freq}\text{NormalizedFrequency} \qquad (1)$$

Table 1, depicted below, is an example of identified textual elements across successive frames of video content and related information described above. The first column indicates the number of the frame, while the second column represents the identified textual elements output by the OCR system. The third column is the confidence level generated by the OCR system, and the fourth column is the text after correction techniques have been applied. The fifth column is the indicator value with respect to the comparison of the identified textual element to a database. The sixth column represents the frequency of the identified textual element within the successive frames.

TABLE 1

Analyzing a Cast Name "Larry Murphy" Across Multiple Frames.

| Frame Sequence | OCR Text | OCR Confidence | Name Corrected Text | Name Confidence | Frequency |
|---|---|---|---|---|---|
| 1 | Inrry Murphy | 1420 | Inrry Murphy | low | 1 |
| 2 | Lurry Murphy | 1227 | Lurry Murphy | mid | 3 |
| 3 | Larry Murphy | 1325 | Larry Murphy | high | 8 |
| 4 | Lurry Murphy | 1046 | Lurry Murphy | mid | 3 |
| 5 | Lurry Murphy | 1193 | Lurry Murphy | mid | 3 |
| 6 | Larry MurphY | 1835 | Larry Murphy | high | 8 |
| 7 | Larry Murphy | 1331 | Larry Murphy | high | 8 |
| 8 | Larry Murphy | 1100 | Larry Murphy | high | 8 |
| 9 | Larry Murphy | 1023 | Larry Murphy | high | 8 |
| 10 | Larry Murphy | 1052 | Larry Murphy | high | 8 |
| 11 | Utrry Murphy | 1236 | Utrry Murphy | low | 1 |
| 12 | Larry Murph | 986 | Larry Murph | high | 1 |
| 13 | Iarar Murphy | 1314 | Iarar Murphy | mid | 1 |
| 14 | Larry Murphy | 1771 | Larry Murphy | high | 8 |
| 15 | Larry Murphy | 1621 | Larry Murphy | high | 8 |

In block 440, the position of the identified textual elements within the video content is determined. The position is defined either by the identity of the frame within which they are present (e.g., frame #89) or the position of the frame in time relative to the beginning or end of the video content (e.g., two minutes and five seconds from the beginning). In some embodiments, the position is a range of frames during which the textual element appears.

The identified textual elements and the determined position are stored within the video content in the memory area in block 450. The memory area includes any form of computer-readable media according to some embodiments.

Figure 5:
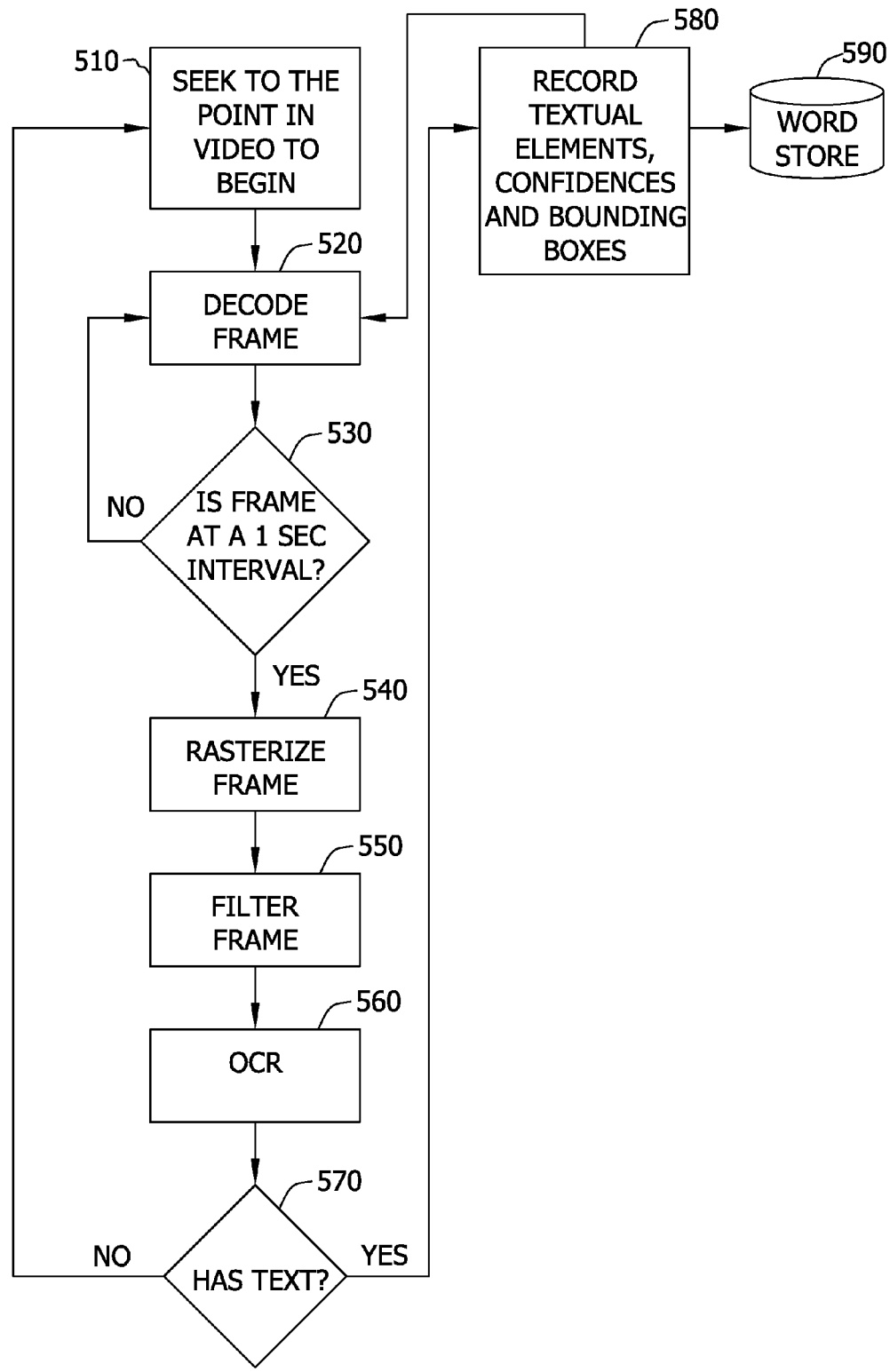
FIG. 5 is an example flow chart for extracting textual elements from video content.

Turning now to FIG. 5, an example flow chart depicts a method for extracting textual elements from video content. The method begins at block 510 by seeking to a point in the video content to begin a first iteration of the method. When the method is first commenced, the point is the first frame in the subset of frames that are to be analyzed.

The frame is decoded from the video content at block 520. Decoding the frame can include extracting the frame from the video content. In decision block 530 a determination is made if the frame is at a one second interval from the previous frame analyzed (e.g., the last frame subjected to blocks 540-580). If the frame is at a one second interval, the method proceeds on to block 540. If the frame is not at a one second interval, the method returns to block 520 wherein the next successive frame is decoded and a determination is made again at block 530 of whether is at a one second interval from the previous frame analyzed. Accordingly, successive frames are decoded in block 520 until a frame is decoded that is at a one second interval from the previous frame analyzed. While specific mention has been made to intervals of one second, other intervals are contemplated as well. For example, intervals can be defined based on number of frames, such as an interval of 45 frames, or they can be of different amounts of time, such as thirty seconds. By only subjecting some of the frames to the analysis described in block 540-580 the computing resources for processing the video content are significantly reduced as OCR systems require considerable computing resources. Further, as most textual elements are presented across many successive frames, it is unlikely that textual elements will be overlooked.

In block 540, the frame is rasterized. Rasterization is the process of transforming an image (e.g., frame) described in a compressed graphics format into a raster image (e.g., an image defined by pixels or dots). Many OCR systems take raster images as input for processing. However, in embodiments that utilize OCR systems that do not take raster formatted images as input, this portion of the method may be skipped.

The frame is filtered in block 550 according to one or more filtering processes. The frame is filtered, for example, according to the processes described in relation to block 230 of FIG. 2, above.

An OCR system is utilized in block 560 to process the filtered frame to extract textual elements from the frame. At decision block 570, a determination is made of whether the OCR system was able to identify any textual elements in the frame. If textual elements were recognized by the OCR system, the method proceeds to block 580. If, however, the OCR system did not identify any textual elements in the frame, the method returns to block 520, wherein the next frame is decoded and the method proceeds accordingly.

In block 580, the textual elements extracted in block 560 are stored in the word store 590 or other memory area or database, along with an identifier of the frame from which the textual elements were extracted. A confidence factor can also be calculated and stored in the word store 590. Calculating the confidence factor involves analyzing the textual elements extracted in block 560 as described herein.

Figure 6A:
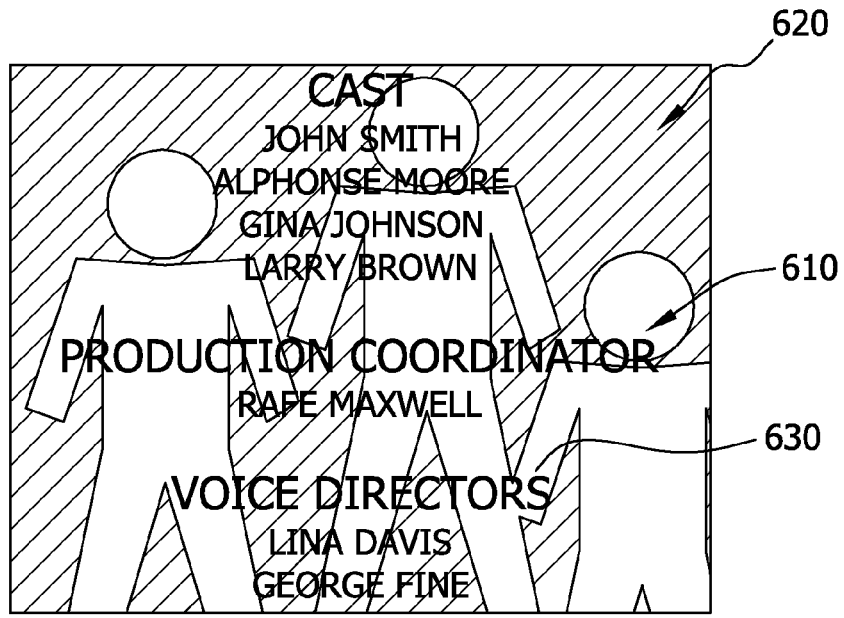
FIG. 6A is an example screen shot of a frame of video content prior to processing.
Figure 6B:
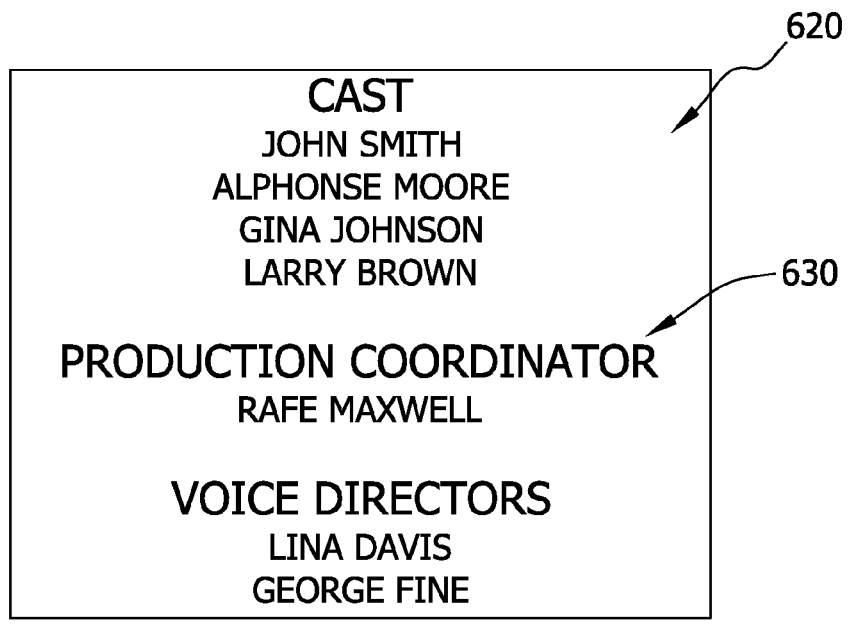
FIG. 6B is an example screen shot of the frame of video content depicted in FIG. 6A after processing.

Referring next to FIG. 6A, an example screen capture of a frame of video content prior to processing is presented. The screen capture depicts the frame as it is presented to the user viewing the video content in its pre-processed state. The screen capture includes exemplary non-textual elements 610 and exemplary textual elements 630. Both the exemplary non-textual elements 610 and exemplary textual elements 630 are overlaid on a background 620. The background 620 includes graphics and images of various colors. The embodiment depicted in FIGS. 6A and 6B is that of a frame of video content depicting production credits, such as the names of members of the cast, the name of the production coordinator, and the names of voice directors. The exemplary textual elements 630 are the words depicted in the frame, while the exemplary non-textual elements 610 are graphics generally depicting people or other images. As in FIGS. 3A and 3B, the overlay of the exemplary textual elements 630 over the background 620 renders the frame ill-suited for processing by an OCR system.

FIG. 6B depicts an example screen shot of the frame of video content depicted in FIG. 6A as it appears after processing according to the methods described in FIG. 2 and FIG. 4. The visibility of the exemplary non-textual elements 610 has been significantly reduced to the point where they are no longer visible. The contrast between the exemplary textual elements 630 and the background 620 of the frame has been increased as well, with the content of the background 320 having been removed. After processing, substantially all of the non-textual elements 610 are removed, and the background 620 is substantially eliminated. An OCR system is then able to readily process a frame such as that depicted in FIG. 6B as the text is suitable for processing by the OCR systems.

Figure 7:
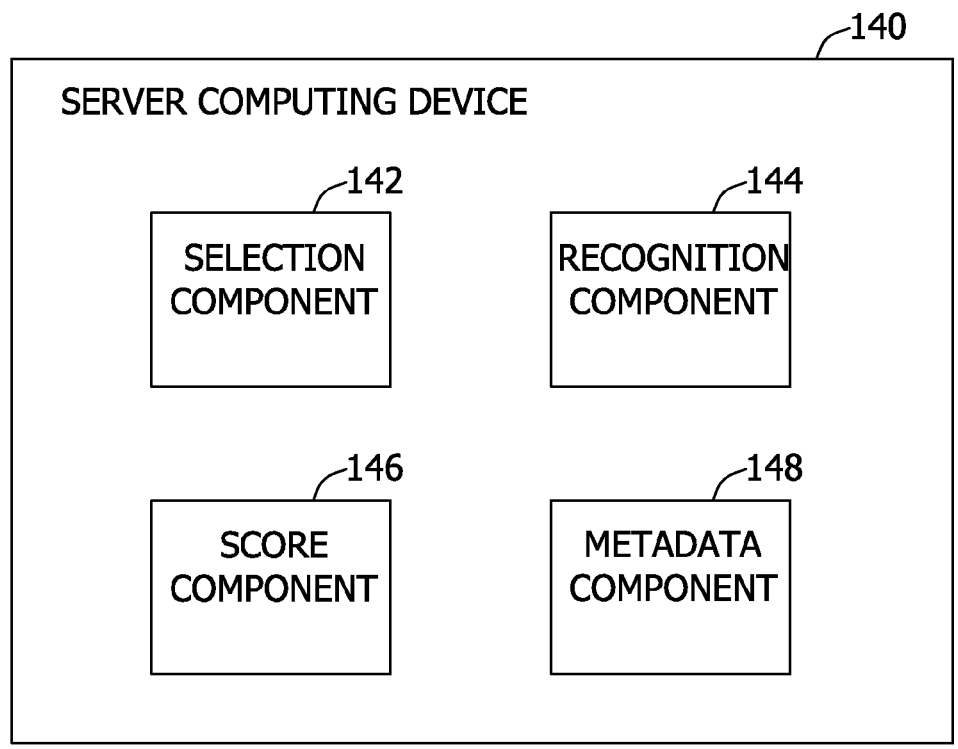
FIG. 7 is a block diagram illustrating an example computing device and components included therein for processing video content.

With reference now to FIG. 7, a block diagram illustrates an example system including components therein for processing video content. The server computing device 140 includes one or more computer-readable media or other memory area storing a selection component 142, a recognition component 144, a score component 146, and a metadata component 148.

The selection component 142 identifies a series of frames that are sequential in time. According to some embodiments, while the frames are sequential in time, they are spaced apart from each other at a set interval. The set interval can be defined based on an amount of time (e.g., one frame per second) or by the position of the frames relative to each other (e.g., every thirtieth frame). The series of frames can be selected based on the category of pre-defined textual elements that are to be identified. For example, if pre-defined textual elements comprising an FBI warning or opening production credits are to be identified in the video content, the series of frames can be those presented close to the beginning of the video content (e.g., frames within the first three minutes). In other embodiments, the category of pre-defined textual elements are those likely to be found at or near the end of the video content, and consequently a series of frames are identified at or near the end of the video content.

The recognition component 144 substantially removes the non-textual elements from the frames identified by the selection component 142 to create filtered frames. The recognition component 144 scans the filtered frames with an OCR system to identify textual elements. In some embodiments, the recognition component 144 scans the filtered frames by scanning two or more successive frames to identify textual elements that are common between the two or more successive frames. As described above in relation to FIG. 2 and FIG. 4, non-textual elements can be removed or their visibility substantially reduced through a variety of filtering processes.

The score component 146 compares the textual elements identified by the recognition component 144 to pre-defined textual elements. The score component 146 produces a confidence rating for each of the textual elements identified by the recognition component 144. The confidence rating is produced as a function of a confidence factor from an OCR system, a confidence factor based on a similarity of the textual elements across successive frames, and a confidence factor based on a frequency of occurrence of the textual elements in the frames. In some embodiments, the score component searches a domain-specific database based on the textual elements and adjusts the confidence rating based on results of the search. For example, the domain-specific database includes a movie database, a name database, or other repository of information specific to the type or category of the textual elements.

The metadata component 148 associates, with the video content, the textual element having a confidence rating produced by the score component 147 that exceeds a pre-defined threshold. In some embodiments, the metadata component 148 selects one of the textual elements based on the confidence rating (e.g., selects the textual element with the highest confidence rating).

In some embodiments, an additional location component (not shown) is provided for calculating an offset value associated with each of the textual elements identified by the recognition component 144. The offset value indicates a position within the video content corresponding to the identified textual elements.

Exemplary Operating Environment

A computing device or computer such as described herein has one or more processors or processing units and a system memory. The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory includes computer storage media in the form of removable and/or non-removable, volatile and/or nonvolatile memory. The computer may operate in a networked environment using logical connections to one or more remote computers, such as a remote computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

In operation, a computer executes computer-executable instructions embodied in one or more computer-executable components stored on one or more computer-readable media to implement aspects of the invention described and/or illustrated herein.

The embodiments illustrated and described herein as well as embodiments not specifically described herein but within the scope of aspects of the invention constitute exemplary means for removing the non-textual elements from the frames, and exemplary means for identifying the subset of the plurality of frames stored in the memory area based on criteria specific to a category of the video content.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for processing video content having a plurality of frames, said video content comprising textual and non-textual elements, said method comprising:

under control of one or more computing systems configured with executable instructions, analyzing a plurality of sequential frames of the video content to identify one or more pre-defined textual elements within at least one of the frames, said analyzed frames being temporally proximal to each other, said at least one of the frames representing a start frame;

analyzing a plurality of successive frames subsequent to said start frame to detect an absence of the pre-defined textual elements within at least one of the frames, said analyzed frames being temporally proximal to each other, said at least one of the frames representing an end frame, said analyzing the plurality of sequential frames and said analyzing the plurality of successive frames comprising:

filtering each of the frames to substantially remove the non-textual elements from the frame;

scanning the filtered frame to identify one or more of the textual elements; and comparing the identified textual elements to the pre-defined textual elements; and calculating an offset value relative to a beginning of the video content and based on the end frame, said offset value indicating a position within the video content corresponding to the end frame.

2. The method of claim 1, wherein analyzing the plurality of the sequential frames comprises analyzing one frame per second of the video content, and wherein analyzing the plurality of the successive frames comprises analyzing adjacent frames in the video content.

3. The method of claim 1, wherein filtering each of the frames comprises removing noise from each of the frames, decolorizing each of the frames, and inverting colors in each of the frames.

4. The method of claim 1, wherein the identified textual elements correspond to one or more of the following: a title, copyright, copyright warning, chapter, caption, credit, prologue, epilogue, product name, and brand name.

5. The method of claim 1, further comprising rasterizing each of the frames prior to said filtering.

6. The method of claim 1, wherein calculating the offset value comprises calculating the offset value as a time duration or quantity of the frames.

7. The method of claim 1, generating a confidence rating based on said comparing.

8. The method of claim 1, further comprising storing the calculated offset with the video content.

9. A system comprising:
one or more processors; and
a memory area for storing video content having a plurality of frames, said video content comprising textual and non-textual elements, the memory area also for storing computer executable instructions that, when executed by the one or more processors, cause the one or more processors to:
identify a subset of the plurality of the frames stored in the memory area, said identified subset being less than all of the frames of the video content and said identified subset being sequential in time and approximately temporal;
filter each of the identified plurality of frames from the subset to substantially remove the non-textual elements from the frame;
scan the filtered frames to identify one or more of the textual elements;
determine a position of the identified textual elements within the video content; and
store the identified textual elements and the determined position with the video content in the memory area.

10. The system of claim 9, wherein the identified one or more textual elements are compared to entries in a database of known pre-defined textual elements.

11. The system of claim 10, wherein the subset of the plurality of frames is identified based on the likely location of one or more pre-defined textual elements within the plurality of frames.

12. The system of claim 9, wherein the processor is further configured to calculate an offset value relative to a beginning of the video content and based on an end frame, said offset value indicating a position within the video content corresponding to the end frame.

13. The system of claim 9, wherein the processor is further configured to:
scan the filtered frames by scanning two or more successive frames to identify similar textual elements across the two or more successive frames; and
select one of the similar textual elements.

14. The system of claim 9, wherein the textual elements comprise one or more of the following: a title, copyright, copyright warning, chapter, caption, credit, prologue, epilogue, product name, and brand name.

15. The system of claim 9, further comprising means for removing the non-textual elements from the frames.

16. The system of claim 9, further comprising means for identifying the subset of the plurality of frames stored in the memory area based on criteria specific to a category of the video content.

17. One or more non-transitory computer-readable media having computer-executable components for processing video content having a plurality of frames, said video content comprising textual and non-textual elements, said components comprising:
a selection component for identifying a series of the frames, said identified series of the frames being sequential in time;
a recognition component for substantially removing the non-textual elements from the frames identified by the selection component to create filtered frames, said recognition component further scanning the filtered frames to identify one or more of the textual elements;
a score component for comparing the textual elements identified by the recognition component to pre-defined textual elements, said comparing producing a confidence rating for each of the textual elements; and
a metadata component for associating, with the video content, the textual elements having a confidence rating produced by the score component that exceeds a pre-defined threshold.

18. The non-transitory computer-readable media of claim 17, further comprising a location component for calculating an offset value associated with each of the textual elements identified by the recognition component, said offset value indicating a position within the video content relative to a beginning of the video content and corresponding to the identified textual elements.

19. The non-transitory computer-readable media of claim 17, wherein the score component produces the confidence rating as a function of a confidence factor from an optical character recognition engine, a confidence factor based on a similarity of the textual elements across successive frames, and a confidence factor based on a frequency of occurrence of the textual elements in the frames.

20. The non-transitory computer-readable media of claim 17, wherein the recognition component scans the filtered frames by scanning two or more successive frames to identify the one or more of the textual elements common to the two or more successive frames.

21. The non-transitory computer-readable media of claim 17, wherein the metadata component selects one of the associated textual elements based on the confidence rating.

22. The non-transitory computer-readable media of claim 21, wherein the metadata component selects said one of the associated textual elements with the highest confidence rating.

23. The non-transitory computer-readable media of claim 17, wherein the score component searches a domain-specific database based on the textual elements and adjusts the confidence rating based on results of the search.

* * * * *